United States Patent [19]

Ogawa et al.

[11] Patent Number: 5,655,307
[45] Date of Patent: Aug. 12, 1997

[54] LASER GRADIENT SETTING DEVICE

[75] Inventors: Yohei Ogawa; Hiroyuki Nishizawa, both of Tokyo-to, Japan

[73] Assignee: Kabushiki Kaisha TOPCON, Tokyo-to, Japan

[21] Appl. No.: 521,024

[22] Filed: Aug. 29, 1995

[30] Foreign Application Priority Data

Aug. 30, 1994 [JP] Japan ..................... 6-228946

[51] Int. Cl.$^6$ ..................... G01C 5/02
[52] U.S. Cl. ..................... 33/291; 33/290
[58] Field of Search ..................... 33/1 H, 1 M, 1 N, 33/281, 282, 283, 285, 290, 291, 365, 529, 534, DIG. 21; 356/138, 247, 248

[56] References Cited

U.S. PATENT DOCUMENTS

| | | | |
|---|---|---|---|
| 3,742,581 | 7/1973 | Roodvoeis | 33/DIG. 21 |
| 3,894,805 | 7/1975 | Middleton | 33/290 |
| 4,062,634 | 12/1977 | Rando et al. | 356/248 |
| 4,136,962 | 1/1979 | Brouwer et al. | 356/248 |
| 4,751,782 | 6/1988 | Ammann | 33/291 |
| 5,313,409 | 5/1994 | Wiklund et al. | 33/291 |
| 5,533,268 | 7/1996 | Keightley | 33/DIG. 21 |

FOREIGN PATENT DOCUMENTS

2250109  5/1992  United Kingdom ............... 33/291

*Primary Examiner*—G. Bradley Bennett
*Attorney, Agent, or Firm*—Nields & Lemack

[57] ABSTRACT

A laser gradient setting device, which comprises a swing frame rotatable around a vertical shaft, a laser projector tiltably mounted on the swing frame via a support member so that it is tiltable around a horizontal shaft, a tilt sensor mounted independently from the laser projector and rotatably around the horizontal shaft, an encoder integrally rotating with the tilt sensor, a vertical angle adjusting means for tilting the support member, and a tilt sensor tilting means mounted on the support member and for tilting the tilt sensor, whereby the tilt sensor is tilted so that the tilt angle detected by the encoder agrees with the preset gradient and the tilt sensor is integrally tilted with the laser projector so that the tilt sensor is held horizontally.

3 Claims, 7 Drawing Sheets

LASER GRADIENT SETTING DEVICE

BACKGROUND OF THE INVENTION

The present invention relates to a laser gradient setting device for setting a reference line in construction and other civil engineering work.

In construction and other civil engineering work, it is necessary to determine a horizontal reference line or a reference line tilted to the horizontal line by a given angle. To set such a reference line, a laser gradient setting device is used.

For example, in case concrete pipes are buried in sewage construction, the pipes must be laid without bending and with inclination at a given angle.

Such concrete pipes are used as flow passages for city water or for sewage or for discharging liquids and are laid with a certain gradient and without bending. If the buried concrete pipes are bent or turned upward, downward, leftward or rightward, the water or liquids are stagnated, clogging the pipes or leaking into the surrounding soil. As a result, the pipes no more fulfill the function as flow passages. Therefore, a proper reference line must be set to ensure perfect burying of the concrete pipes.

As such a reference line, laser beam is the most convenient because it does not slacken like threads even for long distance or it does not hinder the construction work or it is not cut off as the result of interference with the works or concrete pipes.

The above laser gradient setting device emits laser beam and forms a reference line for the purpose of laying concrete pipes.

As one of the representative methods to lay and bury concrete pipes under the ground is the open-cut method, by which the ground is excavated and concrete pipes are placed and buried in the excavated ditch one after another and the ditch is finally filled with soil.

Figure 5:
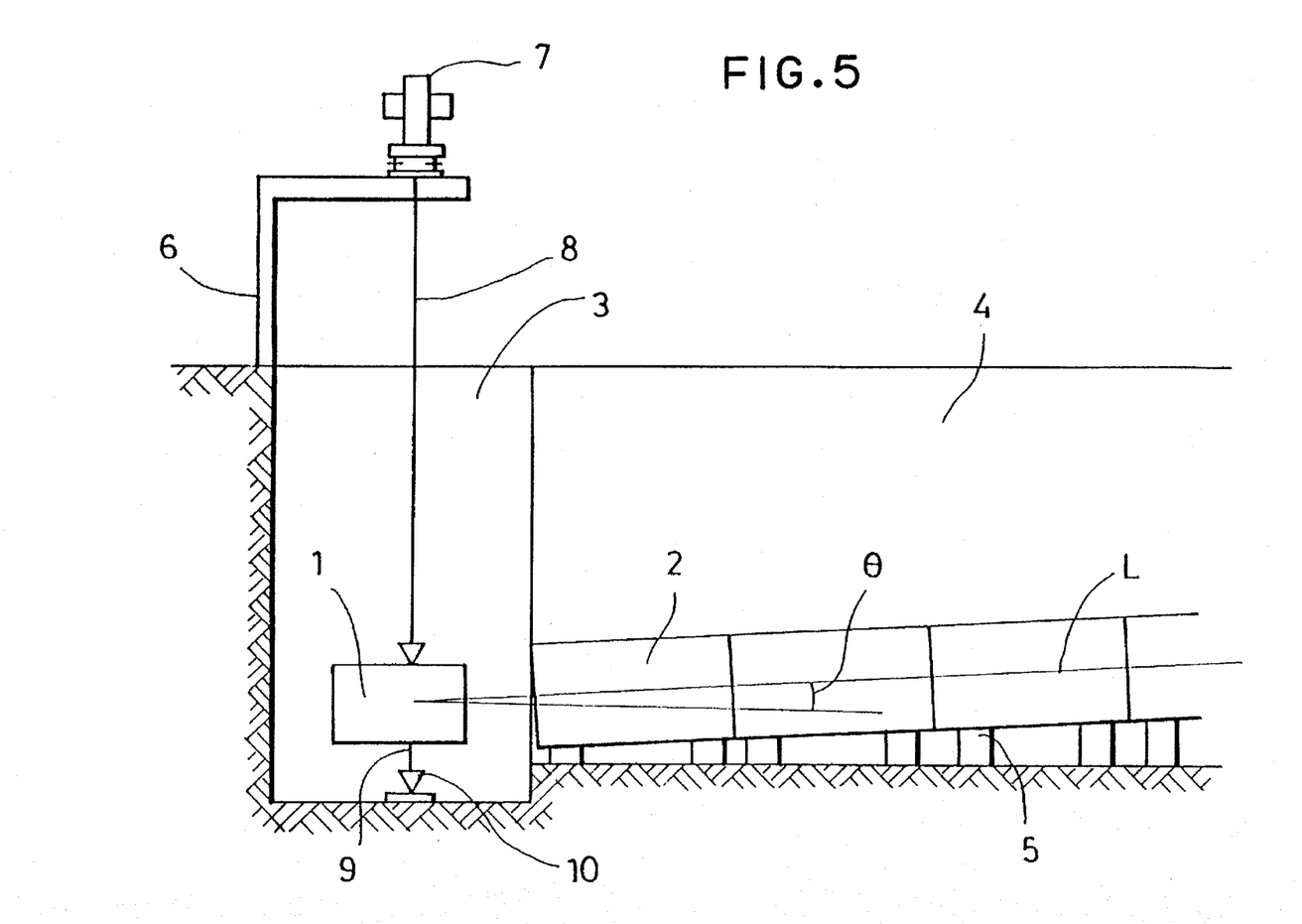
FIG. 5 is a drawing for explaining the open-cut method using the laser gradient setting device.

In the following, description will be given on the open-cut method referring to FIG. 5.

A laser gradient setting device 1 emits laser beam in horizontal direction or in a direction with a certain gradient. If the laser beam is aligned with the horizontal line, it is a horizontal reference line. If the laser beam is inclined at a given angle, it is a reference line with a given gradient.

For each linear section extending for a certain distance, a pit 3 deeper than the depth to lay a concrete pipe 2 is excavated at the starting point to lay the concrete pipe 2, and a burying ditch 4 continuous to the pit 3 is excavated deeper than the depth where the concrete pipe is to be laid. The laser gradient setting device 1 is installed in the pit 3, emitting laser beam at a gradient θ and forming a reference laser beam L. The concrete pipe 2 is laid on a temporary base 5 in the burying ditch 4 in such manner that axial center of the concrete pipe 2 is aligned with the reference line L.

When the axial center of the concrete pipe 2 is aligned with the reference laser beam L, the burying ditch 4 is filled with soil to bury the concrete pipe 2.

The laser gradient setting device 1 must be accurately set in horizontal direction. In the past, horizontal positioning of the laser gradient setting device 1 has been carried out as follows: A support stand 6 is installed above the pit 3 and a transit 7 is placed on the support stand 6. From the transit 7, a plumb-bob 8 is suspended, and the transit 7 is set to align with a known point 10. Further, a laser gradient setting device 1 is installed in the pit 3, and the plumb-bob 8 is aligned with the center of the laser gradient setting device.

Then, another plumb-bob 9 is suspended from the laser gradient setting device 1, and the plumb-bob 9 is aligned with the known point 10.

Figure 6:
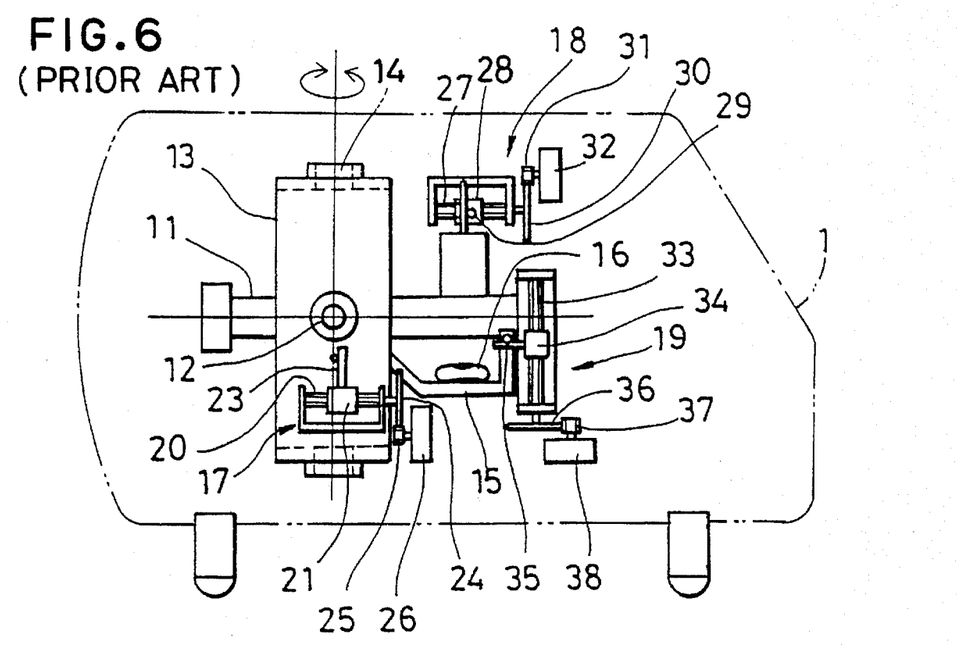
FIG. 6 is a side view of an essential part of a conventional example.

A conventional type laser gradient setting device will be described below in connection with FIGS. 6 and 7.

A laser projector 11 is installed on a swing frame 13, which is tiltable around a horizontal shaft 12, and the swing frame 13 is mounted on a main unit frame (not shown) so that it can be rotated in horizontal direction around a vertical shaft 14. A tilt lever 15 is tiltably mounted on the horizontal shaft 12, and the tilt lever 15 is provided with a tilt sensor 16 such as an electric bubble tube, which issues electric output.

A horizontal angle adjusting mechanism 17 is connected with the swing frame 13, and a vertical angle adjusting mechanism 18 is connected with the laser projector 11. A tilt sensor tilting mechanism 19 is connected with the tilt lever 15. The tilt sensor tilting mechanism 19 is mounted on a support member of the laser projector 11 and is integrally tilted with the laser projector 11.

The horizontal angle adjusting mechanism 17 comprises a first screw 20 rotatably mounted in horizontal direction, a first slide nut 21 screwed in the first screw 20, a pin 23 stuck in the first slide nut 21 and engaged with the swing frame 13, a driven gear 24 attached on the first screw 20, and a horizontal angle adjusting motor 26 connected to the driven gear 24 via a driving gear 25.

The vertical angle adjusting mechanism 18 comprises a second screw 27 rotatably mounted in horizontal direction, a second slide nut 28 screwed in the second screw 27, a pin 29 stuck in the second slide nut 28 and engaged with the laser projector 11, a driven gear 30 attached on the screw 27, and a vertical angle adjusting motor 32 connected to the driven gear 30 via a driving gear 31.

The tilt sensor tilting mechanism 19 comprises a third screw 33 rotatably mounted in vertical direction, a third slide nut 34 screwed in the third screw 33, a pin 35 stuck in the third slide nut 34 and engaged with the tilt lever 15, a driven gear 36 attached on the third screw 33, and a gradient setting motor 38 connected to the driven gear 36 via a driving gear 37. A pulse motor is used as the gradient setting motor 38.

Figure 7:
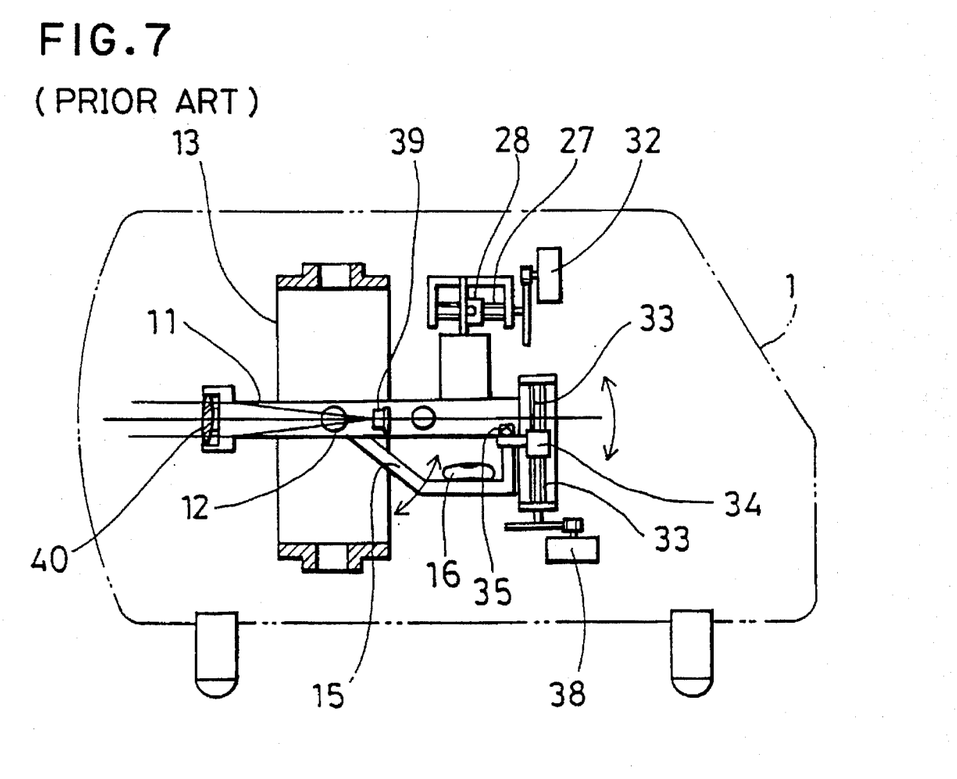
FIG. 7 is a partially cutaway side view of an essential part of the conventional device.

In FIG. 7, reference numeral 39 represents a laser beam emitter, and the laser beam emitted from the laser beam emitter 39 passes through a collimator lens 40 and is irradiated as parallel beams.

Figure 8A:
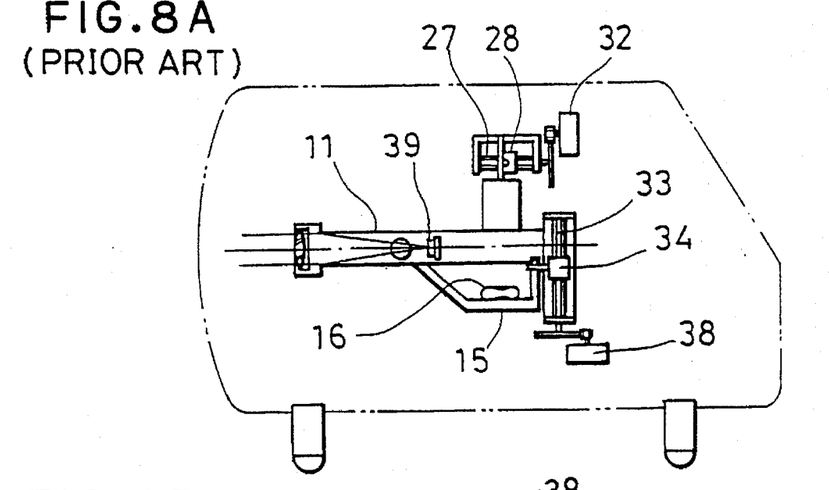
Figure 8B:
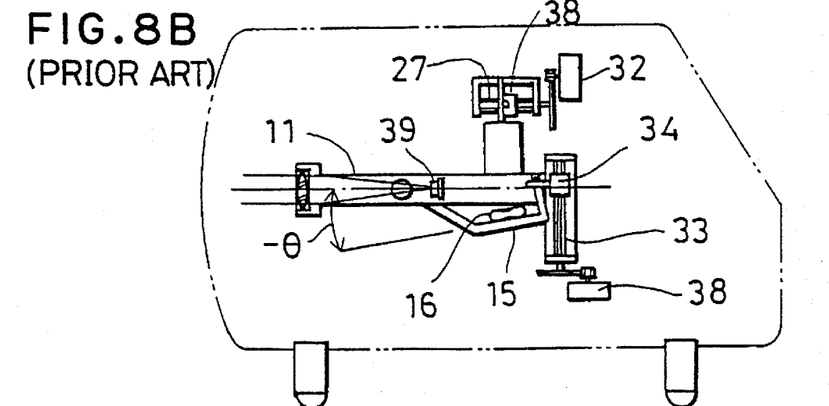
Figure 8C:
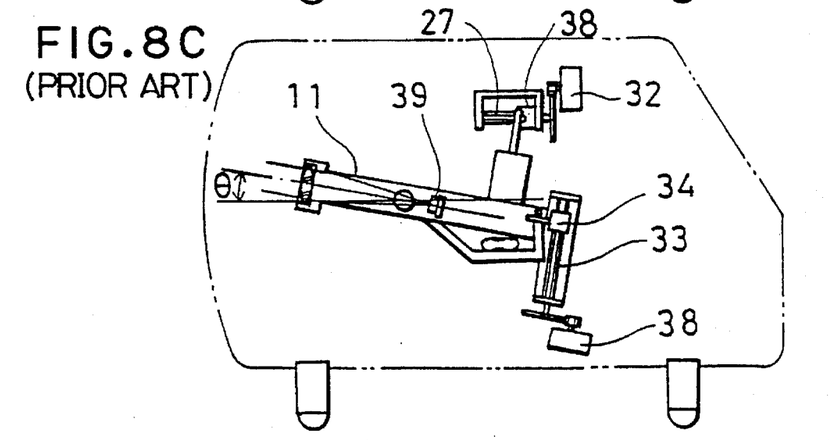
Figure 9:
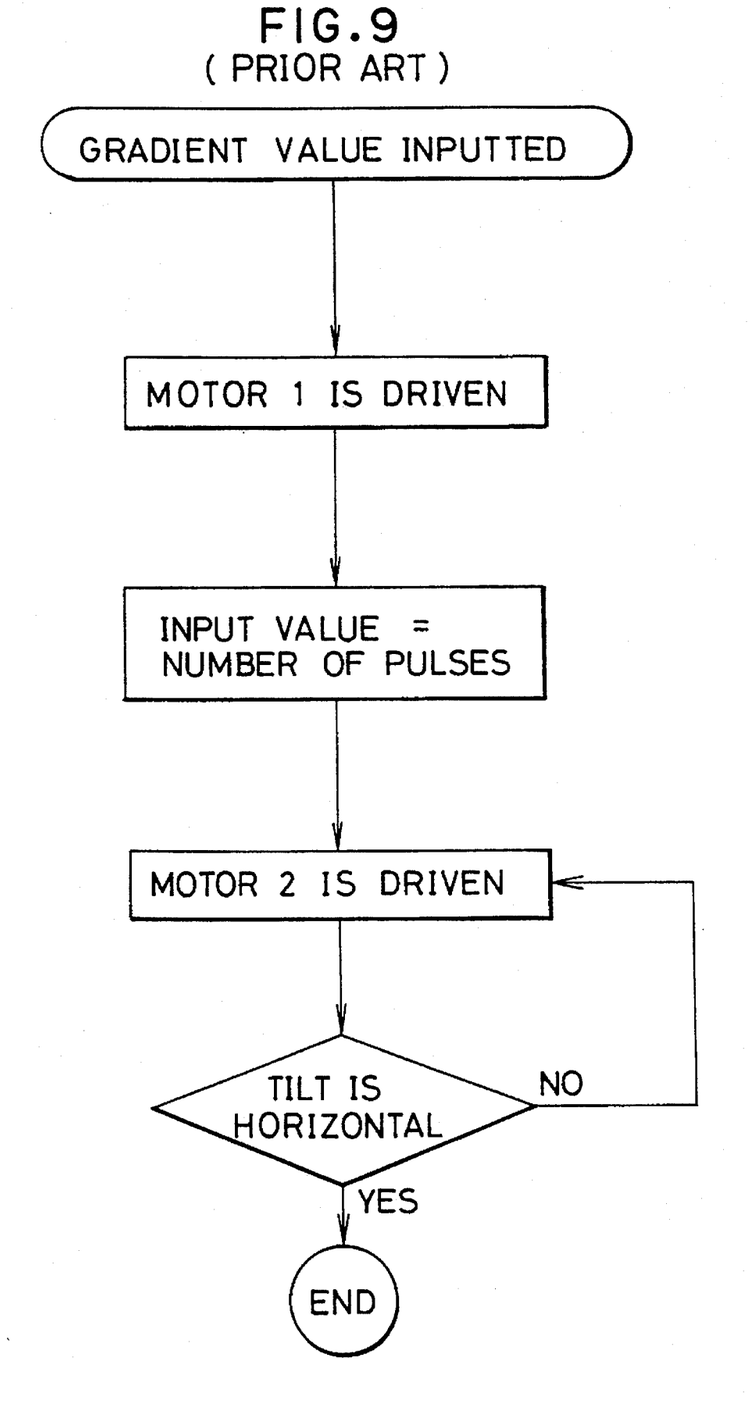
FIG. 9 is a flow chart showing an operation of the conventional device.

Referring to FIGS. 8 and 9, description will be given now on operation of a conventional type laser gradient setting device where setting is made in such manner that the reference line is tilted at an angle θ with respect to the horizontal line.

The laser gradient setting device is installed and it is adjusted horizontally with a bar bubble tube (not shown) on top surface of the laser gradient setting device. In case of a pipe, it is moved in circumferential direction (FIG. 8 (A)).

Next, with the laser projector 11 at horizontal position, the number of pulses corresponding to the preset tilt angle θ is inputted to the gradient setting motor 38 to drive the gradient setting motor 38. The third slide nut 34 is moved upward via the driving gear 37, the driven gear 36, and the third screw 33, and the tilt lever 15 is tilted reversely to the preset angle θ (FIG. 8 (B)).

The vertical angle adjusting motor 32 is driven, and the second slide nut 28 is moved via the driving gear 31, the driven gear 30, and the second screw 27. The laser projector 11 and the tilt lever 15 are integrally tilted. The vertical angle adjusting motor 32 is driven until the angle detected by the tilt sensor 16 reaches a reference level. The reference level is a setting value, which is electrically set to zero (FIG. 8 (C)).

With the tilt sensor 16 at the reference level, the laser projector 11 is tilted and set at the preset angle θ. After the angle has been set, the driven gear 24 is driven, and the laser beam emitted from the laser projector 11 is set in horizontal direction by means of the horizontal angle adjusting mechanism 17.

In the conventional type laser gradient setting device as described above, the angle of the tilt lever 15 is set under the open loop control by the pulse motor. The open loop control by the pulse motor is advantageous in that the position or the number of revolutions can be controlled with relatively simple arrangement. However, it is based on the assumption that the pulse motor is rotated in proportion to the number of the pulses inputted to the pulse motor and that there is no error in rotation transmitting route. In case smooth operation of the pulse motor is hindered due to oil exhaustion, dust, etc., out-of-step phenomenon may occur, and the number of revolutions to match the number of pulses may not be attained. Or, in case backlash occurs in a speed reducer or a screw, the operation of the pulse motor is not accurately transmitted. As a result, in the conventional type laser gradient setting mechanism, which depends upon the number of pulses, the tilt angle may not be correctly set. Further, errors may be accumulated because no function is provided to correct the error.

On the other hand, the distance between manholes tends to be longer in recent years, and there are increasingly strong demands on gradient accuracy in construction work, and it is difficult to meet these requirements by the conventional type laser gradient setting device.

SUMMARY OF THE INVENTION

To solve the above problems, it is an object of the present invention to improve accuracy of the tilt angle setting in the setting of the laser reference level. The laser gradient setting device according to the present invention comprises a swing frame rotatable around a vertical shaft, a laser projector tiltably mounted on the swing frame via a support member so that it can be tilted around a horizontal shaft, a tilt sensor mounted independently from the laser projector and rotatably around the horizontal shaft, an encoder integrally rotating with the tilt sensor, a vertical angle adjusting means for tilting the support member, and a tilt sensor tilting means mounted on the support member and for tilting the tilt sensor.

BRIEF DESCRIPTION OF THE DRAWINGS

FIGS. 3 (A), 3 (B) and 3 (C) are to explain operation of the embodiment;

FIGS. 8 (A), 8 (B) and 8 (C) are to explain operation of the conventional device.

DETAILED DESCRIPTION OF THE PREFERRED EMBODIMENT

Figure 1:
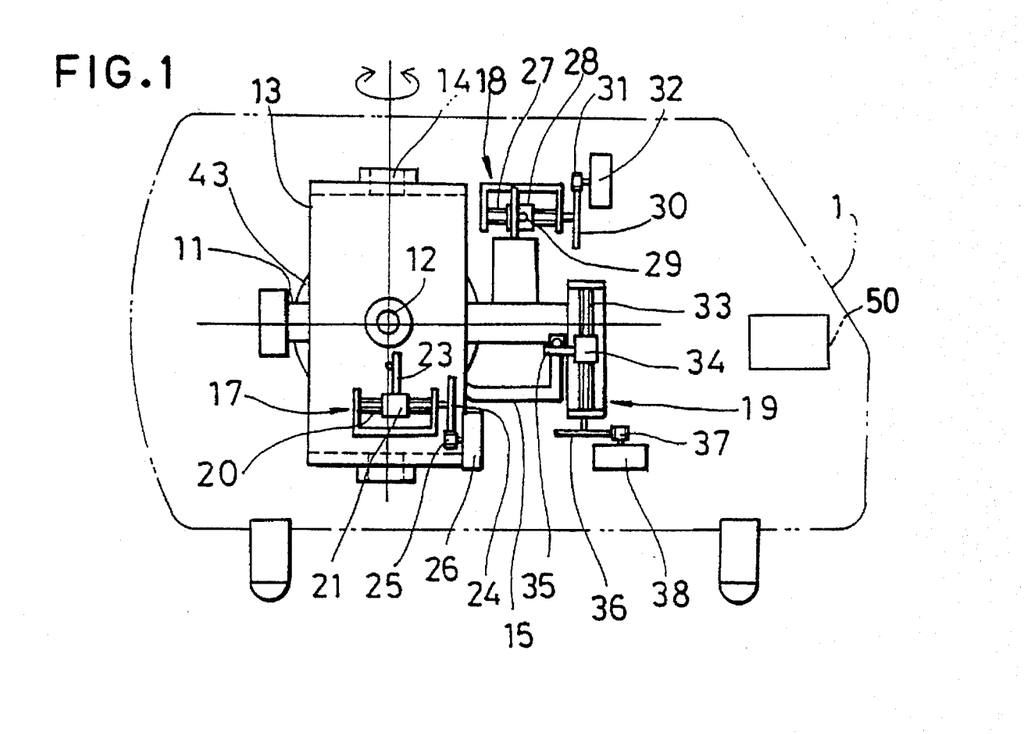
FIG. 1 is a side view showing an essential part of an embodiment of the present invention.
Figure 2:
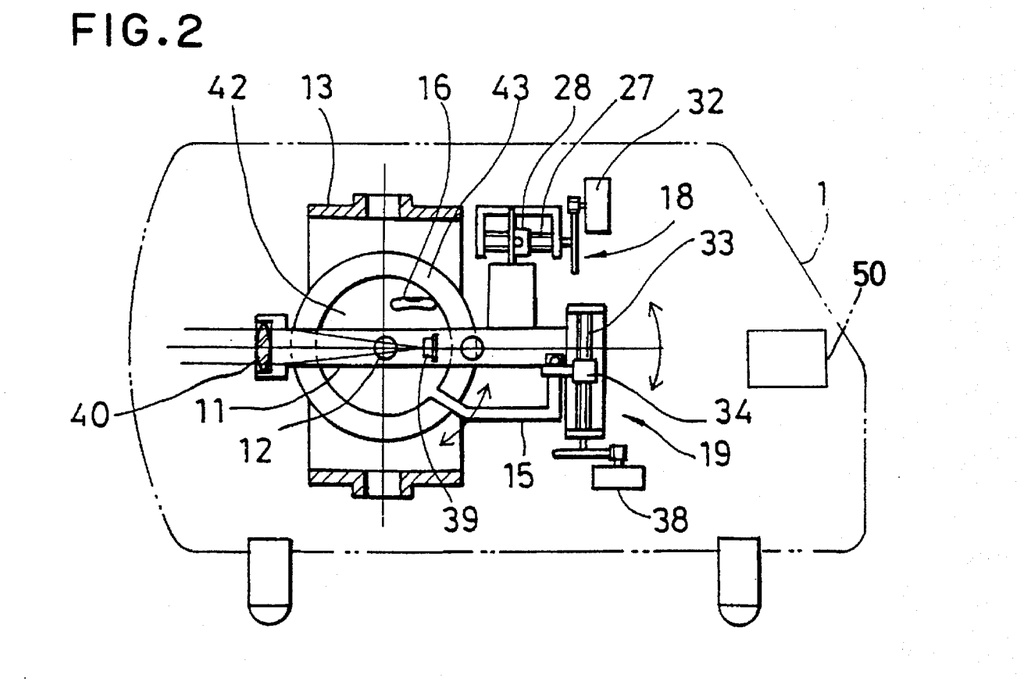
FIG. 2 is a partially cutaway side view of the same embodiment.

In the following, description will be given on an embodiment of the present invention in connection with the drawings. In FIG. 1 and FIG. 2, the same components as in FIG. 6 and FIG. 7 are preferred by the same symbol, and detailed description is not given here.

A laser projector 11 is mounted on a swing frame 13, which is tiltable around a horizontal shaft 12, and the swing frame 13 is mounted on a main frame (not shown) in such manner that it is rotatable in horizontal direction around a vertical shaft 14. A tiltable disk 42 is mounted on the horizontal shaft 12, and a tilt lever 15 is connected with the tiltable disk 42. The tiltable disk 42 is provided with a tilt sensor 16 such as a bubble tube to show horizontal condition. The horizontal shaft 12 is provided with an encoder 43, which is rotatable integrally with the tilt sensor 16, and the encoder 43 detects rotating angle of the horizontal shaft 12, i.e. tilt angle of the laser projector 11. A signal from the encoder 43 is inputted to a controller 50.

A horizontal angle adjusting mechanism 17 is connected to the swing frame 13, and a vertical angle adjusting mechanism 18 is connected to the laser projector 11. A tilt sensor tilting mechanism 19 is connected to the tilt lever 15. The tilt sensor tilting mechanism 19 is mounted on a support member of the laser projector 11 and is tiltable integrally with the laser projector 11.

The horizontal angle adjusting mechanism 17 comprises a first screw 20 rotatably mounted in horizontal direction, a first slide nut 21 screwed in the first screw 20, a pin 23 stuck in the first slide nut 21 and engaged with the swing frame 13, a driven gear 24 attached on the first screw 20, and a horizontal angle adjusting motor 28 connected to the driven gear 24 via a driving gear 25.

The vertical angle adjusting mechanism 18 comprises a second screw 27 rotatably mounted in horizontal direction, a second slide nut 28 screwed in the second screw 27, a pin 29 stuck in the second slide nut 28 and engaged with the laser projector 11, a driven gear 30 attached on the second screw 27, and a vertical angle adjusting motor 32 connected to the driven gear 30 via a driving gear 31.

The tilt sensor tilting mechanism 19 comprises a third screw 33 rotatably mounted in vertical direction, a third slide nut 34 screwed in the third screw 33, a pin 35 stuck in the third slide nut 34 and engaged with the tilt lever 15, a driven gear 36 attached on the third screw 33, and a gradient setting motor 38 connected to the driven gear 36 via a driving gear 37.

A controller 50 controls and drives the horizontal angle adjusting motor 26, the vertical angle adjusting motor 32, and the gradient setting motor 38.

Figure 3A:
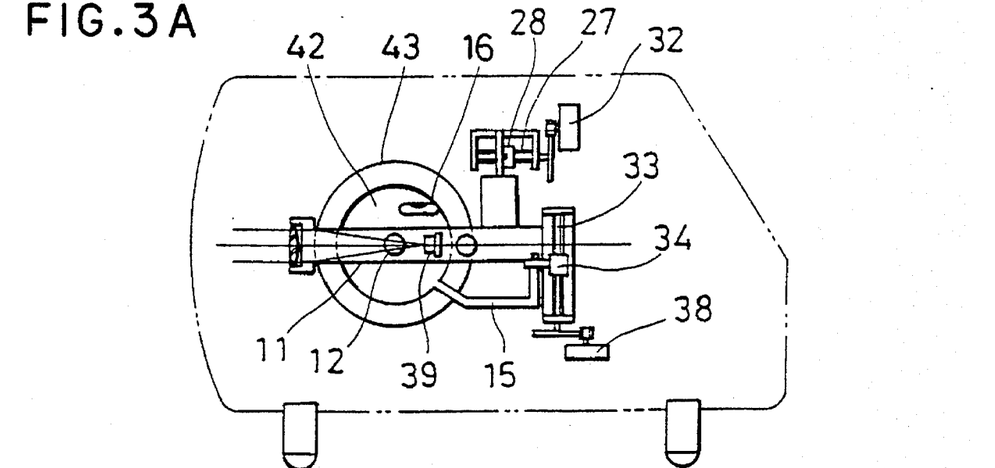
Figure 3B:
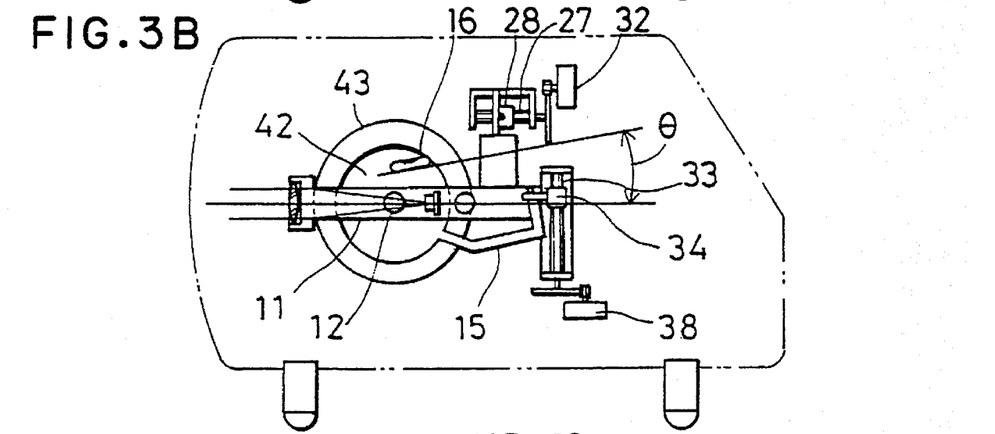
Figure 3C:
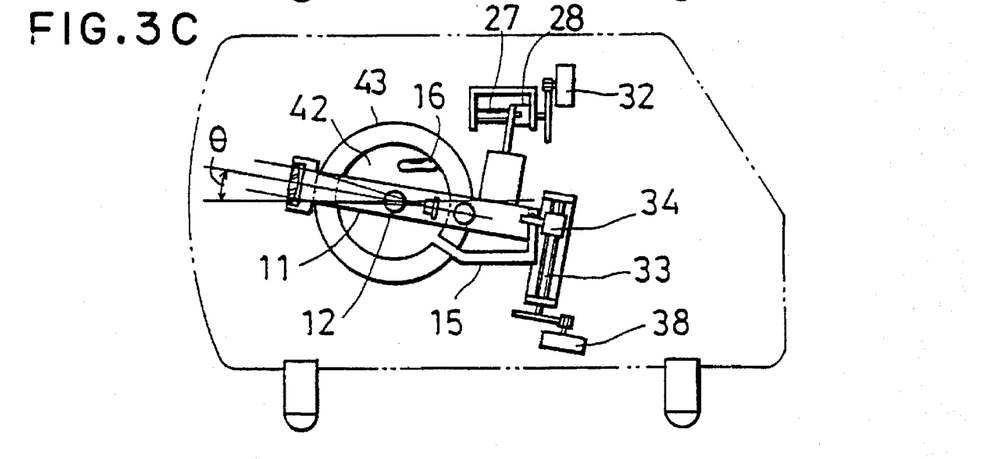
Figure 4:
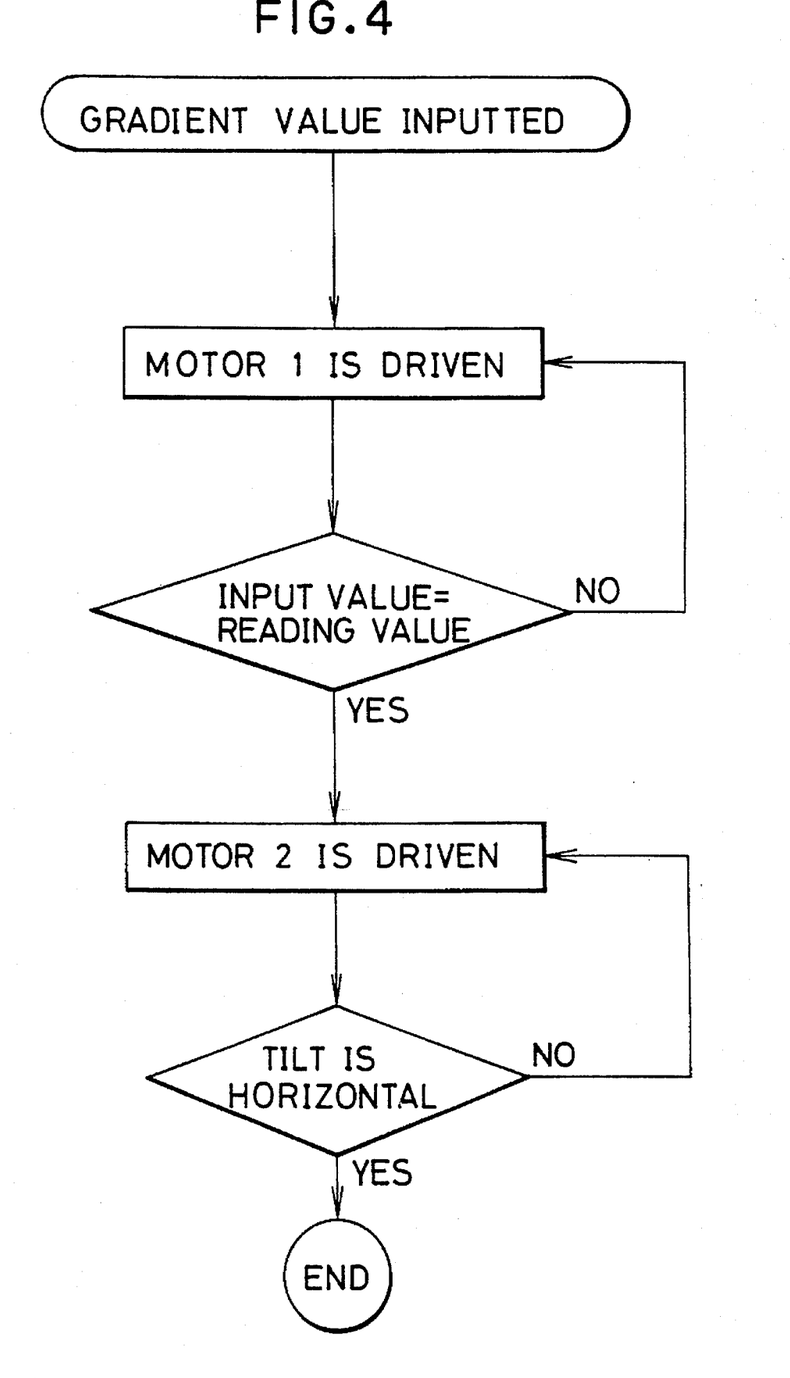
FIG. 4 is a flow chart showing an operation of the embodiment of the present invention.

Next, description will be given on installation of pipes where a reference line is set in such manner that it is inclined at a given angle θ with respect to the horizontal line, referring to FIGS. 3 and 4.

The laser gradient setting device is installed and it is adjusted in the manner that the circumferential direction of the pipe becomes approximately horizontal using a bar bubble tube (not shown) provided on top surface of the laser gradient setting device main unit.

Next, the laser projector 11 inputs a preset tilt angle θ to the controller 50, and the gradient setting motor 38 is driven by the controller. The third slide nut 34 is moved upward via the driving gear 37, the driven gear 36, and the third screw 33, and the tilt lever 15 is tilted reversely to the preset angle θ (FIG. 3 (B)). The tilt lever 15 is rotated integrally with the tiltable disk 42, and the rotating angle of the tiltable disk 42 is detected by the encoder 43 and is fed back to the controller 50. When the detection angle of the encoder 43 agrees with the preset angle, the gradient setting motor 38 is stopped.

The vertical angle adjusting motor 32 is driven, and the second slide nut 28 is moved via the driving gear 31, the driven gear 30 and the second screw 27. The laser projector 11 and the tilt lever 15 are integrally tilted via the pin 29. The vertical angle adjusting motor 32 is driven until the angle detected by the tilt sensor 16 reaches 0, and the laser projector 11 is tilted.

The tilt sensor 16 is tilted via the laser projector 11, the tilt lever 15 and the tiltable disk 42. When the controller detects the reference level from the tilt sensor 16, the vertical angle adjusting motor 32 is stopped, and laser beam emitted from the laser projector 11 is set to the preset angle θ (FIG. 3 (C)). After the angle has been set, the driven gear 24 is driven, and the laser beam emitted from the laser projector 11 is set in horizontal direction by the horizontal angle adjusting mechanism 17.

In case the laser gradient setting device is to be installed after the gradient setting has been completed by the laser gradient setting device, it is not always necessary to set the laser projector in horizontal direction. Because the angle set earlier can be obtained by the encoder regardless of which angle the main unit is installed at, the difference from the newly set angle is calculated, and the angle agrees with the newly set angle when the tilt sensor reaches the reference level.

It is needless to say that motors such as a pulse motor, a DC motor, a servomotor, etc. can be used as the gradient setting motor 38. Also, it will suffice if the encoder 43 is mechanically linked to the tiltable disk 42, and it may be linked to the horizontal shaft 2 via a shaft coupling or via operation transmitting means such as gears. Because the encoder 43 detects actual tilt angle, the gradient may be displayed on the gradient setting display unit arranged at a given position on the laser gradient setting device. The tilt sensor 16 may not necessarily be mounted on the tiltable disk 42 and it may be provided on the tilt lever 15 or a component which is tilted integrally with the tilt lever 15.

Further, the encoder 43 may be of optical type or magnetic type.

As described above, a closed loop system is adopted in the present invention, in which tilting of the laser projector is directly detected and it is controlled so that the detection result agrees with the preset angle. Accordingly, there is no influence from the error on the mechanisms, and the gradient can be set with high accuracy. Cumulative error does not occur even when the device is repeatedly used.

What we claim are:

1. A laser gradient setting device, comprising a swing frame rotatable around a vertical shaft, a laser projector tiltably mounted on the swing frame via a support member so that it is tiltable around a horizontal shaft, a tilt sensor mounted independently from the laser projector and rotatably around the horizontal shaft, an encoder integrally rotating with the tilt sensor, a vertical angle adjusting means for tilting the support member, and a tilt sensor tilting means mounted on the support member and for tilting the tilt sensor.

2. A laser gradient setting device according to claim 1, comprising a controller which operates the vertical angle adjusting means and the tilt sensor tilting means according to the signals from the tilt sensor and the encoder.

3. A laser gradient setting device according claims 1 or 2, wherein the tilt sensor is tilted in such manner that the tilt angle detected by the encoder agrees with the preset gradient, and the tilt sensor is integrally tilted with the laser projector so that the tilt sensor is held horizontally.

* * * * *